July 7, 1953 H. W. DENISON ET AL 2,644,647
FISHING REEL
Filed Aug. 14, 1950
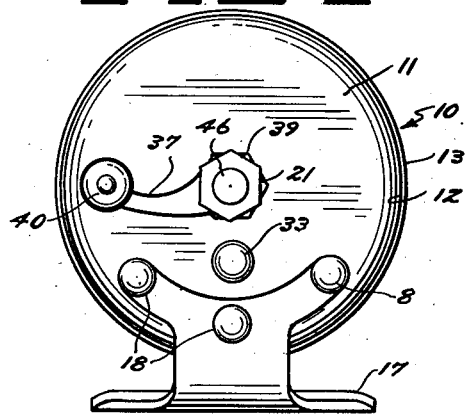
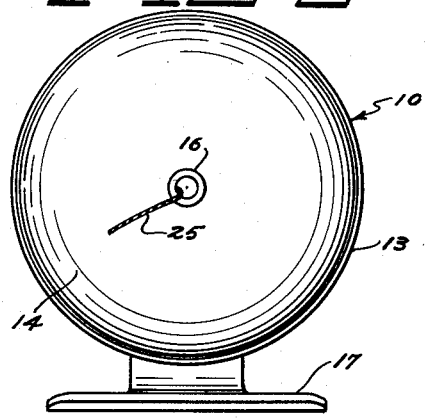
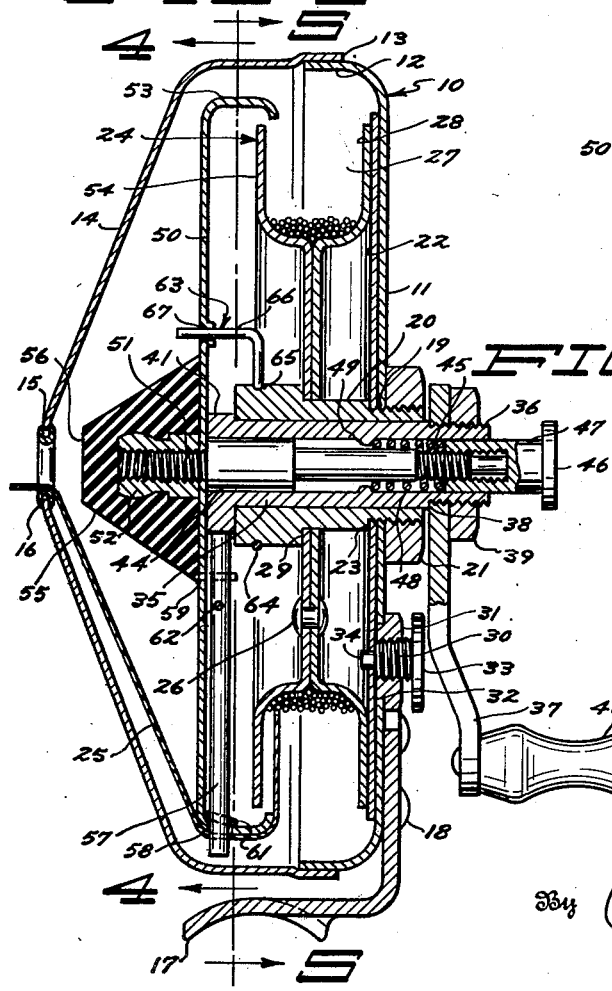
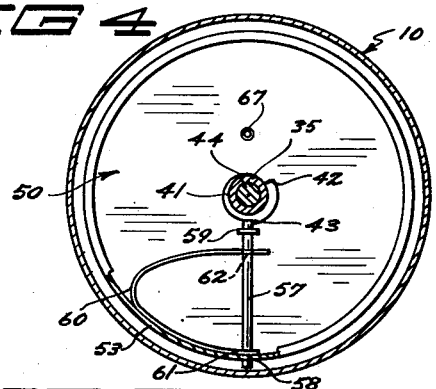
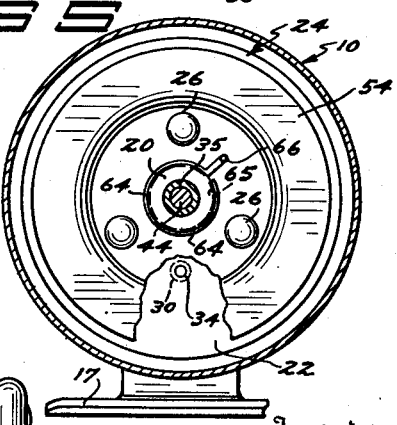
Inventor
HENRY WARREN DENISON
LLOYD E. JOHNSON
By Carlsen + Hagle
ATTORNEYS Patented July 7, 1953

2,644,647

UNITED STATES PATENT OFFICE 2,644,647

FISHING REEL

Henry Warren Denison and Lloyd E. Johnson, Mankato, Minn., assignors to Denison-Johnson, Inc., Mankato, Minn., a corporation of Minnesota Application August 14, 1950, Serial No. 179,188

11 Claims. (Cl. 242—84.1)

1

This invention relates generally to improvements in fishing reels and more specifically to fixed spool reels of the kind originally developed for spinning but now used for fishing with various kinds and types of equipment.

Prior to the advent of the spinning reel the usual fishing reel had a rotating spool on which the fish line was coiled and in casting this spool rotated to pay out the line. While very effective in the hands of a skilled caster, this rotating spool does introduce difficulties in that its inertia and momentum limit the casting distance, require that the bait have considerable weight, and all too frequently cause the spool to overrun at the end of the cast, forming a backlash. In contrast the spinning type of reel has a fixed spool from which the line "peels" off in coils with extremely little resistance. As a result light lines may be cast accurately to long distances and backlashes are eliminated. Such spinning reels have heretofore, however, been quite complex and expensive in construction, and awkward to use, with the result that their general adoption by the fishing fraternity has been slow, particularly by persons accustomed to and skilled in the use of the older styles of reels.

The primary object of our invention, accordingly, is to provide a fixed spool style of reel which is simple and inexpensive, durable, compact and neat, and which may be used handily on the three most used types of fishing rods, i. e., the bait casting rod, the fly rod, and the spinning rod, all with equal facility. The reel may furthermore be used and operated with one hand, whereas a number of other styles of spinning reels now require both hands.

Another object of the invention is to provide a reel of this character which includes dual drags designed to assist in playing a fish, to prevent line breakage and facilitate trolling, with one of such drags being adjustable according to the breaking strength of the line used, and the other being one-way drag operating only when a fish takes out line from the reel.

Another and important object is to provide a reel having a single, centrally located button conveniently operable by the hand holding and manipulating the rod itself, and which button controls the outflow of the fishing line and also controls the flight of the lure or length of the cast.

A further object is to provide various important refinements in reels of this nature, all of which materially contribute to the effective construction and operation of the reel as will be presently made clear.

These and other more detailed and specific objects will be disclosed in the course of the following specification, reference being had to the accompanying drawings, in which—

Fig. 1 is a side elevation of the reel of our invention, looking at the same from the side carrying the crank and adjustable drag.

2

Fig. 2 is an elevation of the opposite side, showing the center opening from which the line emerges.

Fig. 3 is an enlarged diametrical sectional view through the reel.

Figs. 4 and 5 are sectional views, on a reduced scale, taken respectively along the lines 4—4 and 5—5 in Fig. 3.

Referring now more particularly and by reference characters to the drawing, our improved fishing reel comprises an outer frame or housing, designated generally at 10, made up of a stationary end plate 11 of circular shape and having an annular flange 12 upon which is frictionally fitted the rim 13 of a removable cover indicated at 14. This cover 14 is conical in shape and at its center or apex is provided with an opening 15 in which is secured a line guide eyelet 16. The reel has the conventionally shaped tang 17 by which it is secured in any usual manner to the fishing rod and this tang is attached to the end plate 11 as by means of rivets indicated at 18.

The end plate 11 has a centrally located opening 19 in which is secured a main bearing member 20 held in place by a nut 21 upon the outer face of the end plate. Located within the end plate is a circular clutch plate or disk 22 and the bearing 20 is shouldered as indicated at 23 so that turning up the nut 21 will clamp this disk firmly to the end plate. This bearing assembly also carries the spool indicated generally at 24 upon which the fishing line 25 is wound and this spool as shown in the drawing is made up of two identical sections or halves which are riveted together at 26 and around their outer margins are offset in opposite directions in order to form an annular line receiving groove 27. One rim 28 of this grooved portion of the spool bears frictionally upon the inner face of the clutch disk 22 and the spool is held in such position by a second shoulder 29 formed upon the bearing 20 and engaging the center of the spool as clearly shown in Fig. 3. While casting the spool 24 is fixed and does not rotate as the line 25 is payed out, but under certain circumstances to be later described the spool may rotate upon the bearing 20 with this rotation frictionally retarded by the contact of the rim 28 and clutch disk 22. The magnitude of this resistance to rotation of the spool is adjustable by means of a drag adjusting screw 30 threaded through an insert 31 pressed into an opening 32 formed in the end plate 11. The end of the screw 30 is thus brought into position for inward engagement with the clutch plate 22, just inwardly of the rim 28 of the spool, and by turning the enlarged head 33 of the screw the clutch plate may be urged with more or less force against the rim as will be readily understand. In addition this drag screw 30 is provided with a reduced projection 34 upon its inner end which penetrates the clutch plate 22 and anchors the same positively against rotation with the spool and with reference to the end plate 11.

The bearing 20 is tubular and journaled through the bore of the bearing is a tubular shaft 35 which extends outwardly beyond the nut 21, where the shaft is reduced and threaded at 36 to accommodate the conventionally formed end of a crank 37. That is, this threaded end 36 of the shaft is flattened upon opposite sides while the end of the crank is similarly shaped so as to positively lock the crank and shaft together to rotate as a unit. The crank, of course, may be removed for disassembling the reel, but when assembled it is held tightly against the shoulder 38 on the shaft by means of a second nut 39. The usual knob 40 is provided upon the outer end of the crank. The inner extremity of the shaft 35 is diametrically enlarged to bear against the adjacent end of the bearing 20 but this enlargement is not circular but instead is formed with a cam surface 41 eccentric to the axis of the shaft and terminating in radially spaced shoulders or abutments appearing at 42 and 43 in Fig. 4. The bore of the shaft 35 is occupied by an axially movable operating pin 44, one end of which is shaped and sized to nicely fit the bore while the other end is diametrically reduced and threaded at its extremity as indicated at 45. This threaded extremity 45 of the pin terminates inside the threaded end 36 of the shaft and a control button 46 is provided having a tubular tapped neck 47 adapted to fit slidably into the shaft and screw upon this end of the pin. An expansion coil spring 48 is placed around the reduced end of the pin 44 and braced between the inner end of the button and an inwardly turned shoulder 49 formed at about the center of the shaft 35. The spring 48 thus normally projects the button 46 outward or to the right as viewed in Fig. 3 so that the button stands in spaced relation to the adjacent end of the shaft.

The pin 44 carries a rotatable, circular spooling member or plate 50 disposed alongside the spool 24 in spaced relation thereto. At its center the spooling member has an opening through which there projects a reduced and threaded end 51 of the pin 44 and a nut 52 is screwed upon this end to lock the spooling member to the pin as clearly shown. The spooling member is slightly larger in diameter than the spool itself and around its margin is provided with a smoothly rounded flange 53 which in the normal position of the parts encompasses and projects over the rim 54 of the spool opposite the previously referred to rim 28. The nut 52 is rounded and grooved in order to anchor a line snubbing member 55 made of rubber or some analogous material and truncated in shape. In practice the nut 52 will, of course, be molded into this snubbing member, but however made it will be observed that the small flat end 56 of the member stands in alignment with and inwardly spaced relation to the line guide eyelet 16.

The spooling member 50 carries a radially extending pickup or spooling pin 57 located in alignment with the cam surface 41 upon the shaft 35 and slidably mounted through an opening 58 formed in the flange 53 of the spooling member. Adjacent the cam the pin 57 is slidably passed through an apertured ear 59 punched in from the spooling member thus supporting the pin for inward and outward movements in radial planes, immediately within the circular portion of the spooling member. As shown in Fig. 4 a bowed wire spring 60 is formed with an eye 61 at one end to slidably embrace the pin 57 immediately within the flange 53 and at its opposite end this pin is thrust diametrically through an opening 62 formed through the pin outward of the ear 59. This spring 60 is tensioned to normally spread apart at its ends and thus acts to normally draw the pin 57 radially inward causing its inner extremity to ride the cam surface 41.

The spooling member 50 is connected to the bearing 20 by a one way drag spring designated generally at 63 and this spring is formed with a circular parted loop 64 at one end disposed in an annular groove 65 around the enlarged inner end of the bearing. From this loop 64 the spring extends a short distance radially outward and then is turned at right angles so that its opposite ends 66 will project for some distance slidably through an opening 67 formed in the spooling member.

In operation the spool 24 is filled with the line 25 and upon reassembly of the reel this line passes outward over the flange 53 of the spooling member and then inward and finally outward through the guide eyelet 16. In the normal position of the parts illustrated in Fig. 3 the pickup pin 57 projects for a short distance outward through the flange of the spooling member and in order to reel in the line the crank 37 is turned by hand causing the spooling member to rotate therewith. This rotation of the spooling member is insured by the engagement of the cam abutment 43 with the inner extremity of the pickup pin and the result is that this pin will spool the line evenly while drawing the line inward through the guide eyelet 16. In order then to cast a lure attached to the outer or free end of the fishing line the operator presses upon the button 46 and projects the button and the attached pin 44 as well as the entire pickup and spooling assembly toward the left until this motion is halted by contact of the end 56 of the snubber 55 with the line where it issues through the eyelet guide 16. When the parts are moved to this position the pickup pin 57 clears the cam surface 41 upon the shaft 35 and the spring 60 immediately moves this pin inward so that its outer end lies flush, or even immediately within, the smooth surface of the flange 53. By then slightly relaxing the pressure upon the button 46 the snubber 55 will free the line and it may be cast by any of the usual casting motions used with the different types of rods to which the reel is adapted. There being now no obstruction to the flow of the line off the spool it will uncoil or peel off and around the spooling member with a resistance so negligible so that very light lures may be cast accurately and to great distances. To stop the flight of the lure and regulate the length of the cast, the operator merely thumbs the button 46 to bring the snubber 45 into contact with the outgoing line. When it is desired to reel in the line again the operator merely starts the usual motion of the crank 37 and as soon as the low spot of the cam surface 41 comes into alignment with the inner end of the pickup pin 57 the spring 48 will return the spooling member 50 and connected parts to their starting positions again aligning the pin 57 with the cam. Continued movement of the crank 37 will then cause the cam surface 41 to project the pickup pin outward until the abutment 43 is reached whereupon the spooling member 50 will begin turning and the pin will re-spool the line. It will thus be noted that the button 47 is the one and only control necessary for freeing the line for fixed spool casting and also for thumbing the reel or controlling the out flow of the line. After each cast is completed the operator merely turns the crank 37 as he normally would to retrieve the lure and a portion of the first complete revolution results in the return of the parts to position for re-spooling the line as has just been described.

The drag adjusting screw 30 acts to impart a definite and adjustable resistance against the out flow of the fishing line when the parts are in their normal position and thus is a convenience similar to that commonly called the "star drag" upon other types of reels. In addition, this adjustable drag upon the spool permits it to rotate and pay out the line should the lure strike an obstruction in the water, or if the lure is struck by a heavy fish. The magnitude of the drag is, of course, adjusted and selected according to the breaking strength of the fishing line used so as to release the spool for rotation before the line is broken in such cases. In addition the drag spring 63 imparts a one way resistance to rotation of the spooling member with the loop 64 operating to constrict or bind in the groove 65 when the spooling member is rotating in the direction it takes when the line is pulling out and turning the spooling member. When the spooling member rotates in the other direction, or the one in which it rotates in re-spooling the line, the spring loop 64 has a tendency to expand in the groove 65 and thus while the spring of necessity always rotates with the spooling member it offers little or no resistance to the normal operation thereof. This one way drag is a decided convenience since it insures that there will always be a resistance to the out flow of the line even should the knob 40 of the handle slip out of the fingers in playing a heavy fish. The spring drag also operates to retard the out flow of the line when trolling as will be readily understood.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a fishing reel of the character described, a frame, a line spool in the frame and the frame having a guide opening for passing the line outwardly and off the end of the spool, a spooling member supported alongside the spool and having a projecting pin for spooling the line, a handle connected to the spooling member for rotating the same, and control mechanism for disengaging the spooling member from the handle and for withdrawing the pin so that the line may peel off of the spool and out said guide opening.

2. In a fishing reel of the character described, a frame, a line spool in the frame and the frame having a guide opening for passing the line outwardly and off the end of the spool, a spooling member supported alongside the spool and having an outwardly projecting pin for spooling the line, a handle connected to the spooling member for rotating the same, and control mechanism located at the center of the handle for disengaging the spooling member from the handle and for withdrawing the pin so that the line may peel off of the spool and out said guide opening.

3. In a fishing reel of the character described, a frame, a line spool in the frame and the frame having a guide opening for passing the line outwardly and off the end of the spool, a spooling member supported alongside the spool and having a projecting pin for spooling the line, a handle connected to the spooling member for rotating the same, control mechanism for disengaging the spooling member from the handle and for withdrawing the pin so that the line may peel off of the spool and out said guide opening, and a one way drag for frictionally retarding rotation of the spooling member in a direction to pay out the line from the reel.

4. In a fishing reel of the character described, a frame, a line spool in the frame and the frame having a guide opening for passing the line outwardly and off the end of the spool, a spooling member supported alongside the spool and having an outwardly projecting pin for spooling the line, a handle connected to the spooling member for rotating the same, control mechanism for disengaging the spooling member from the handle and for withdrawing the pin so that the line may peel off of the spool and out said guide opening, a one way drag operative to retard rotation of the spooling member in a direction for paying out line from the reel, and said control mechanism including a button movable axially with reference to the spool.

5. In a fishing reel of the character described, a frame, a line spool in the frame and the frame having a guide opening for passing the line outwardly and off the end of the spool, a spooling member supported alongside the spool and having a projecting pin for spooling the line, a handle connected to the spooling member for rotating the same, and control mechanism for disengaging the spooling member from the handle and for withdrawing the pin so that the line may peel off of the spool and out said guide opening, the said control mechanism including a single control button located exteriorly of the reel frame.

6. In a fishing reel of the character described, a frame having one end plate and a cover, a line spool arranged in the frame beside the end plate and the cover having a centrally located guide out through which a fishing line may pass off the end of the spool, a bearing extending centrally through the spool and end plate, a tubular shaft journaled through the bearing, a handle on the outer end of the shaft alongside the end plate, an operating member mounted through said tubular shaft and spring biased to a normal position, a cam on the inner end of the tubular shaft, a control button on the opposite outer end of the operating member, a spooling member on the operating member alongside the spool, a pickup pin extending generally radially of the spooling member and engaged by the cam to connect the member to the handle, the pin normally projecting from the spooling member to spool the line as the handle is turned, the operating member being movable axially by pressure on the control button to project the spooling member away from the spool and clear the pickup pin from the cam so that said pin may move inwardly and clear the line as it peels from the spool, and a spring arranged to normally draw the pickup pin inwardly with respect to the spooling member.

7. In a fishing reel of the character described, a frame having one end plate and a cover, a line spool arranged in the frame beside the end plate and the cover having a centrally located guide out through which a fishing line may pass off the end of the spool, a bearing extending centrally through the spool and end plate, a tubular shaft journaled through the bearing, a handle on the outer end of the shaft alongside the end plate, an operating member mounted through said tubular shaft and spring biased to a normal position, a cam on the inner end of the tubular shaft, a control button on the opposite outer end of the operating member, a spooling member on the operating member alongside the spool, a pickup pin extending radially of the spooling member and engaged by the cam to connect the member to the handle, the pin normally projecting from the spooling member to spool the line as the handle is turned, the operating member being movable axially by pressure on the control button to project the spooling member away from the spool and clear the pickup pin from the cam so that said pin may move inwardly and clear the line as it peels from the spool, a spring arranged to normally draw the pickup pin inwardly with respect to the spooling member, and a snubbing member on the center of the spooling member adapted as said control button is pressed to contact the line flowing outward through the guide.

8. In a fishing reel of the character described, a frame having one end plate and a cover, a line spool arranged in the frame beside the end plate and the cover having a centrally located guide out through which a fishing line may pass off the end of the spool, a bearing extending centrally through the spool and end plate, a tubular shaft journaled through the bearing, a handle on the outer end of the shaft alongside the end plate, an operating member mounted through said tubular shaft and spring biased to a normal position, a cam on the inner end of the tubular shaft, a control button on the opposite outer end of the operating member, a spooling member on the operating member alongside the spool, a pickup pin extending radially of the spooling member and engaged by the cam to connect the member to the handle, the pin normally projecting from the spooling member to spool the line as the handle is turned, the operating member being movable axially by pressure on the control button to project the spooling member away from the spool and clear the pickup pin from the cam so that said pin may move inwardly and clear the line as it peels from the spool, a spring arranged to normally draw the pickup pin inwardly with respect to the spooling member, and a trunconical snubber on the center of the spooling member for snubbing the line flowing out through the guide as said control button is pressed.

9. In a fishing reel of the character described, a frame having one end plate and a cover, a line spool arranged in the frame beside the end plate and the cover having a centrally located guide out through which a fishing line may pass off the end of the spool, a bearing extending centrally through the spool and end plate, a tubular shaft journaled through the bearing, a handle on the outer end of the shaft alongside the end plate, an operating member mounted through said tubular shaft and spring biased to a normal position, a cam on the inner end of the tubular shaft, a control button on the opposite outer end of the operating member, a spooling member on the operating member alongside the spool, a pickup pin extending radially of the spooling member and engaged by the cam to connect the member to the handle, the pin normally projecting from the spooling member to spool the line as the handle is turned, the operating member being movable axially by pressure on the control button to project the spooling member away from the spool and clear the pickup pin from the cam so that said pin may move inwardly and clear the line as it peels from the spool, a spring arranged to normally draw the pickup pin inwardly with respect to the spooling member, and a parted coil spring engaged around the bearing and slidably connected to the spooling member to frictionally retard rotation of the same in one direction.

10. In a fishing reel of the character described, a frame having one end plate and a cover, a line spool arranged in the frame beside the end plate and the cover having a centrally located guide out through which a fishing line may pass off the end of the spool, a bearing extending centrally through the spool and end plate, a tubular shaft journaled through the bearing, a handle on the outer end of the shaft alongside the end plate, an operating member mounted through said tubular shaft and spring biased to a normal position, a cam on the inner end of the tubular shaft, a control button on the opposite outer end of the operating member, a spooling member on the operating member alongside the spool, a pickup pin extending radially of the spooling member and engaged by the cam to connect the member to the handle, the pin normally projecting from the spooling member to spool the line as the handle is turned, the operating member being movable axially by pressure on the control button to project the spooling member away from the spool and clear the pickup pin from the cam so that said pin may move inwardly and clear the line as it peels from the spool, and a spring arranged to normally draw the pickup pin inwardly with respect to the spooling member, the said spooling member having a smooth annular marginal flange overlying one peripheral edge of the spool.

11. In a fishing reel of the character described, a frame having an end plate and a cover thereon, a line spool arranged in the frame beside the end plate and the cover having a centrally located guide out through which a fishing line may peel off the end of the spool, a spooling member operatively supported alongside this end of the spool and having a projecting pin for spooling the line, a handle connected to rotate the spooling member, control mechanism operative to disengage the spooling member from the handle and for withdrawing the pin so the line may peel off the spool, said control mechanism including means moving the spooling member away from the spool and toward the cover, and means forming part of the spooling member to grip the line against the inside of the cover as the spooling member moves away from the spool to thereby stop the outward flow of the line.

HENRY WARREN DENISON.
LLOYD E. JOHNSON.

References Cited in the file of this patent

UNITED STATES PATENTS

| Number | Name | Date |
|---|---|---|
| 2,492,587 | Ledingham | Dec. 27, 1949 |
| 2,507,457 | Rix | May 9, 1950 |
| 2,521,543 | Shakespeare et al. | Sept. 5, 1950 |
| 2,538,153 | Guthrie | Jan. 16, 1951 |

FOREIGN PATENTS

| Number | Country | Date |
|---|---|---|
| 618,929 | Great Britain | Mar. 1, 1949 |